(12) United States Patent
Lee et al.

(10) Patent No.: US 9,936,400 B2
(45) Date of Patent: Apr. 3, 2018

(54) CHANNEL SELECTION IN A SHARED COMMUNICATION MEDIUM

(71) Applicant: QUALCOMM Incorporated, San Diego, CA (US)

(72) Inventors: Heechoon Lee, San Diego, CA (US); Akula Aneesh Reddy, San Diego, CA (US); Ahmed Kamel Sadek, San Diego, CA (US); Tamer Adel Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 14/852,515

(22) Filed: Sep. 12, 2015

(65) Prior Publication Data
US 2017/0078894 A1    Mar. 16, 2017

(51) Int. Cl.
*H04W 24/02* (2009.01)
*H04W 72/08* (2009.01)
(Continued)

(52) U.S. Cl.
CPC ............ *H04W 24/02* (2013.01); *H04L 43/16* (2013.01); *H04W 16/14* (2013.01); *H04W 72/082* (2013.01); *H04W 88/10* (2013.01)

(58) Field of Classification Search
CPC ......... H04L 43/16; H04L 43/00; H04L 43/50; H04W 16/14; H04W 24/02; H04W 48/02;
(Continued)

(56) References Cited

U.S. PATENT DOCUMENTS

| | | | | |
|---|---|---|---|---|
| 5,148,548 A | * | 9/1992 | Meche | H04W 72/082 455/296 |
| 6,456,844 B1 | * | 9/2002 | Parantainen | H04W 48/06 455/1 |

(Continued)

FOREIGN PATENT DOCUMENTS

| | | | |
|---|---|---|---|
| CA | 2826395 A1 | 8/2012 | |
| EP | 2560427 A1 * | 2/2013 | ............ H04W 16/10 |

(Continued)

OTHER PUBLICATIONS

International Search Report and Written Opinion—PCT/US2016/051026—ISA/EPO—dated Nov. 22, 2016.

*Primary Examiner* — Robert Lopata
(74) *Attorney, Agent, or Firm* — Muncy, Geissler, Olds & Lowe, P.C.

(57) ABSTRACT

Techniques for channel selection in a shared communication medium are disclosed. A communication apparatus may include one or more transceivers, a processor, and memory coupled to the processor and configured to store data and/or instructions. The one or more transceivers may be configured to monitor signaling on a plurality of available channels associated with a communication medium. The processor may be configured to determine an interference level for each of the plurality of available channels based on the monitored signaling, determine that the interference level for each of the plurality of available channels is greater than a first threshold, determine whether a triggering condition is met, and select the first channel of the plurality of channels as an operating channel for a primary radio access technology based on the triggering condition being met, the first channel having an interference level that is greater than a second threshold.

30 Claims, 7 Drawing Sheets

(51) Int. Cl.
*H04L 12/26* (2006.01)
*H04W 16/14* (2009.01)
*H04W 88/10* (2009.01)

(58) Field of Classification Search
CPC ... H04W 72/082; H04W 84/12; H04W 24/00; H04B 17/00; H04B 3/46
USPC .......................................................... 370/252
See application file for complete search history.

(56) References Cited

U.S. PATENT DOCUMENTS

| | | | |
|---|---|---|---|
| 6,628,639 B1* | 9/2003 | Ishii | H04W 76/02 370/333 |
| 7,110,374 B2* | 9/2006 | Malhotra | H04W 72/02 370/329 |
| 7,330,697 B1* | 2/2008 | Bolt | H04W 16/10 455/63.1 |
| 7,330,698 B1* | 2/2008 | Bolt | H04W 16/10 455/63.1 |
| 2002/0136183 A1 | 9/2002 | Chen et al. | |
| 2005/0153667 A1* | 7/2005 | Cave | H04W 16/10 455/90.3 |
| 2009/0129273 A1* | 5/2009 | Zou | H04L 45/70 370/235 |
| 2011/0261782 A1* | 10/2011 | Nakano | H04W 72/082 370/330 |
| 2013/0165134 A1* | 6/2013 | Touag | H04W 72/0486 455/452.1 |
| 2013/0208587 A1 | 8/2013 | Bala et al. | |
| 2013/0244681 A1* | 9/2013 | Ookubo | H04W 72/082 455/452.1 |
| 2015/0036514 A1 | 2/2015 | Zhu et al. | |
| 2015/0063323 A1* | 3/2015 | Sadek | H04W 72/1215 370/336 |
| 2016/0260059 A1* | 9/2016 | Benjamin | G06Q 10/0832 |

FOREIGN PATENT DOCUMENTS

| | | |
|---|---|---|
| WO | 03081925 A1 | 10/2003 |
| WO | 2015034993 A1 | 3/2015 |

* cited by examiner

CHANNEL SELECTION IN A SHARED COMMUNICATION MEDIUM

INTRODUCTION

Aspects of this disclosure relate generally to telecommunications, and more particularly to coexistence between wireless Radio Access Technologies (RATs) and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long-Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points (e.g., with a range of 10 meters to 2 kilometers operating on unlicensed frequency spectrum) have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operations is designed to increase spectral efficiency and hence capacity of the LTE system. However, it may also encroach on the operations of other Radio Access Technologies (RATs) that typically utilize the same unlicensed bands, most notably IEEE 802.11 WLAN technologies generally referred to as "Wi-Fi."

SUMMARY

The following summary is an overview provided solely to aid in the description of various aspects of the disclosure and is provided solely for illustration of the aspects and not limitation thereof.

In one example, a communication apparatus is disclosed. The communication apparatus may include, for example, one or more transceivers, a processor, and memory coupled to the processor and configured to store data, instructions, or a combination thereof. The one or more transceivers may be configured to monitor signaling on a plurality of available channels associated with a communication medium. The plurality of available channels includes a first channel. The processor may be configured to determine an interference level for each of the plurality of available channels based on the monitored signaling, determine that the interference level for each of the plurality of available channels is greater than a first threshold, determine whether a triggering condition is met, and select the first channel as an operating channel for a primary radio access technology based on the triggering condition being met, the first channel having an interference level that is greater than a second threshold.

In another example, a communication method is disclosed. The communication method may include, for example, monitoring signaling on a plurality of available channels associated with a communication medium, the plurality of available channels including a first channel. The method may further include determining an interference level for each of the plurality of available channels based on the monitored signaling, and determining that the interference level for each of the plurality of available channels is greater than a first threshold. The method may additionally include determining whether a triggering condition is met, and selecting the first channel as an operating channel for a primary radio access technology based on the triggering condition being met, the first channel having an interference level that is greater than a second threshold.

In another example, another communication apparatus is disclosed. The communication apparatus may include, for example, means for monitoring signaling on a plurality of available channels associated with a communication medium. The plurality of available channels includes a first channel. The communication apparatus may further includes means for determining an interference level for each of the plurality of available channels based on the monitored signaling, and means for determining that the interference level for each of the plurality of available channels is greater than a first threshold. The communication apparatus may additionally include means for determining whether a triggering condition is met, and means for selecting the first channel as an operating channel for a primary radio access technology based on the triggering condition being met, the first channel having an interference level that is greater than a second threshold.

In another example, a non-transitory computer-readable medium including code, which, when executed by a processor, causes the processor to perform operations is disclosed. The computer-readable medium may include, for example, code for monitoring signaling on a plurality of available channels associated with a communication medium, the plurality of available channels including a first channel, code for determining an interference level for each of the plurality of available channels based on the monitored signaling, code for determining that the interference level for each of the plurality of available channels is greater than a first threshold, code for determining whether a triggering condition is met, and code for selecting the first channel as an operating channel for a primary radio access technology based on the triggering condition being met, the first channel having an interference level that is greater than a second threshold.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
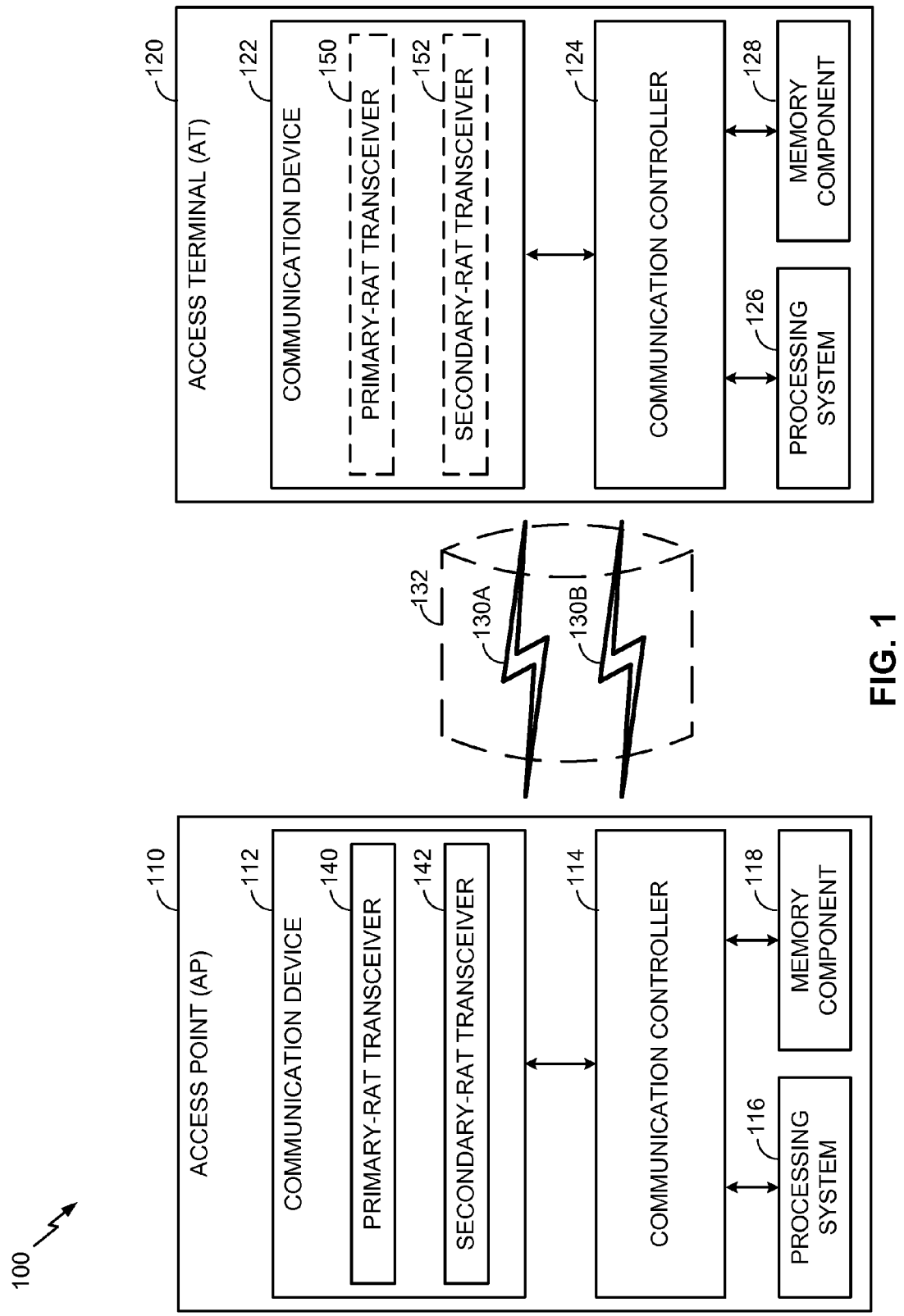
FIG. 1 illustrates an example wireless communication system including an access point in communication with an access terminal.

The present disclosure relates generally to a channel selection scheme in a shared communication medium. In relation to the shared communication medium, a primary-RAT may relate to a radio access technology that is designated for substantive communication between the device measuring the interference and another device over the shared communication medium. The term secondary-RAT may be any other radio access technology and in some examples may have one or more transceivers collocated within the same device as the primary-RAT transceiver. Additionally, in some examples, limited communications may occur from the device measuring the interference to other devices using the secondary-RAT to obtain information to aid in the channel selection.

According to certain aspects, one of a plurality of available channels associated with a communication medium may be selected as an operating channel for a primary-RAT transceiver based on an interference level determined for each of the available channels. In some scenarios, each of the available channels may have an interference level greater than a first threshold, such that no clean channels (channels with low interference, e.g., less than or equal to −82 dBm) are available. Upon detecting that there are no clean channels available, rather than simply selecting the channel having the lowest interference level as the operating channel, another channel may be selected that has a higher interference level. Although contrary to conventional techniques, selecting a channel with a higher interference level may reduce the impact of interference on the selected channel in the shared communication medium.

For example, it will be appreciated that there can be a tradeoff between having a secondary-RAT transceiver (e.g., a WLAN access point) above a second threshold (e.g., −62 dBm) and having the secondary-RAT transceiver between the first threshold and second threshold (e.g., −62 dBm to −82 dBm), as explained below in greater detail.

In one case where the secondary-RAT transceiver is above a second threshold at the primary RAT transceiver (e.g., an LTE unlicensed frequency band Small Cell) the secondary RAT may stop transmitting during the primary RAT transmissions using coexistence mechanisms. In this scenario, both the primary and secondary-RAT transceivers may each get approximately fifty percent of the time interference free (e.g., the primary-RAT transceiver may use a coexistence mechanism to allow the secondary-RAT transceiver fifty percent of the time to transmit).

In the other case where the secondary-RAT transceiver is between the first threshold and second threshold range at the primary RAT transceiver, the secondary-RAT transceiver may get one hundred percent of the time (but fifty percent of the time may include interference from the primary RAT transceiver using its coexistence mechanism). Even though the secondary-RAT transceiver has the fifty percent of the time interference free in this scenario, the secondary-RAT transceiver rate control may act as hindrance and prevent the use of the fifty percent interference free time in an efficient manner (e.g., by inappropriately reducing the transmission rate). Accordingly, as noted above and discussed below in greater detail, under some conditions selecting a channel with a higher interference level may reduce the impact of interference on the selected channel in the shared communication medium.

Various aspects of the disclosure are provided in the following description and related drawings directed to various examples provided for illustration purposes only. Alternate aspects may be devised without departing from the scope of the disclosure. Additionally, well-known aspects of the disclosure may not be described in detail or may be omitted so as not to obscure more relevant details.

Further, it will be appreciated that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 illustrates an example wireless communication system 100 including an Access Point (AP) 110 in communication with an Access Terminal (AT) 120. Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, WLAN APs, other small coverage area APs, etc. Small cells may be deployed to supplement macro cell coverage, which may cover a few blocks within a neighborhood or several square miles in a rural environment, thereby leading to improved signaling, incremental capacity growth, richer user experience, and so on.

In the example of FIG. 1, the access point 110 and the access terminal 120 each generally include a wireless communication device (represented by the communication devices 112 and 122) for communicating with other network nodes via at least one designated RAT. The communication devices 112 and 122 may be variously configured for transmitting and encoding signals or signaling (e.g., messages, indications, information, and so on), and, conversely, for receiving and decoding signals (e.g., messages, indications, information, pilots, and so on) in accordance with the designated RAT. The access point 110 and the access terminal 120 may also each generally include a communication controller (represented by the communication controllers 114 and 124) for controlling operation of their respective communication devices 112 and 122 (e.g., directing, modifying, enabling, disabling, etc.). The communication controllers 114 and 124 may operate at the direction of or otherwise in conjunction with respective host system functionality (illustrated as the processing systems 116 and 126 and the memory components 118 and 128 coupled to the processing systems 116 and 126, respectively, and configured to store data, instructions, or a combination thereof). In some designs, the communication controllers 114 and 124 may be partly or wholly subsumed by the respective host system functionality.

Turning to the illustrated communication in more detail, the access terminal 120 may transmit and receive signals via a first channel 130A or a second channel 130B with the access point 110, the signals can include messages including information related to various types of communication (e.g., voice, data, multimedia services, associated control signaling, etc.). The first channel 130A and the second channel 130B may operate over a communication medium of interest, shown by way of example in FIG. 1 as the communication medium 132, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the access point 110 and the access terminal 120 for the communication medium 132. It will be understood from FIG. 1 that multiple channels may exist in the communication medium 132. Although the multiple channels are represented by the first channel 130A and the second channel 130B, there may in fact be any number of channels in the communication medium 132 (for example, less than two or more than two). Moreover, the channels in the communication medium 132 may be distinguishable from one another based on one or more of operating RAT, operating frequency (or frequencies), or any other characteristic.

As an example, the communication medium 132 may correspond to at least a portion of an unlicensed frequency band shared with other RATs. In general, the access point 110 and the access terminal 120 may operate via the first channel 130A or the second channel 130B according to one or more RATs depending on the network in which they are deployed. These networks may include, for example, different variants of Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for such communications (e.g., by a government entity such as the Federal Communications Commission (FCC) in the United States), certain communication networks, for example, those employing small cell access points, have extended operation into unlicensed frequency bands such as the Unlicensed National Information Infrastructure (U-NII) band used by Wireless Local Area Network (WLAN) technologies, most notably IEEE 802.11 WLAN technologies generally referred to as "Wi-Fi."

In the example of FIG. 1, the communication device 112 of the access point 110 includes two co-located transceivers operating according to respective RATs, including a primary-RAT transceiver 140 configured to operate in accordance with one RAT and a secondary-RAT transceiver 142 configured to operate in accordance with another RAT. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a WLAN chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The primary-RAT transceiver 140 and the secondary-RAT transceiver 142 may provide different functionalities and may be used for different purposes. As an example, the primary-RAT transceiver 140 may operate in accordance with Long-Term Evolution (LTE) technology to provide communication with the access terminal 120 on the first channel 130A and/or the second channel 130B, while the secondary-RAT transceiver 142 may operate in accordance with WLAN technology to monitor WLAN signaling on the communication medium 132 that may interfere with or be interfered with by the LTE communications. The secondary-RAT transceiver 142 may or may not serve as a full WLAN AP providing communication services to a corresponding Basic Service Set (BSS). In some implementations, the secondary-RAT transceiver 142 may be omitted entirely. The communication device 122 of the access terminal 120 may, in some designs, include similar primary-RAT transceiver and/or secondary-RAT transceiver functionality, as shown in FIG. 1 by way of the primary-RAT transceiver 150 and the secondary-RAT transceiver 152, although such dual-transceiver functionality may not be required. Additionally, it will be appreciated that the access point 110 and/or the access terminal 120 are not limited to the illustrated configurations and that other known components of communication devices may be included in the access point 110 and/or the access terminal 120 but are not illustrated to avoid unnecessary complexity of the figures. For example, the other known components may include one or more of a wired network interface (e.g., a local area network (LAN) interface), short range radio system (e.g., Bluetooth®), satellite position system receiver (e.g., the Global Positioning System (GPS)) and/or user interface (e.g. display, soft or hard keys).

Figure 2:
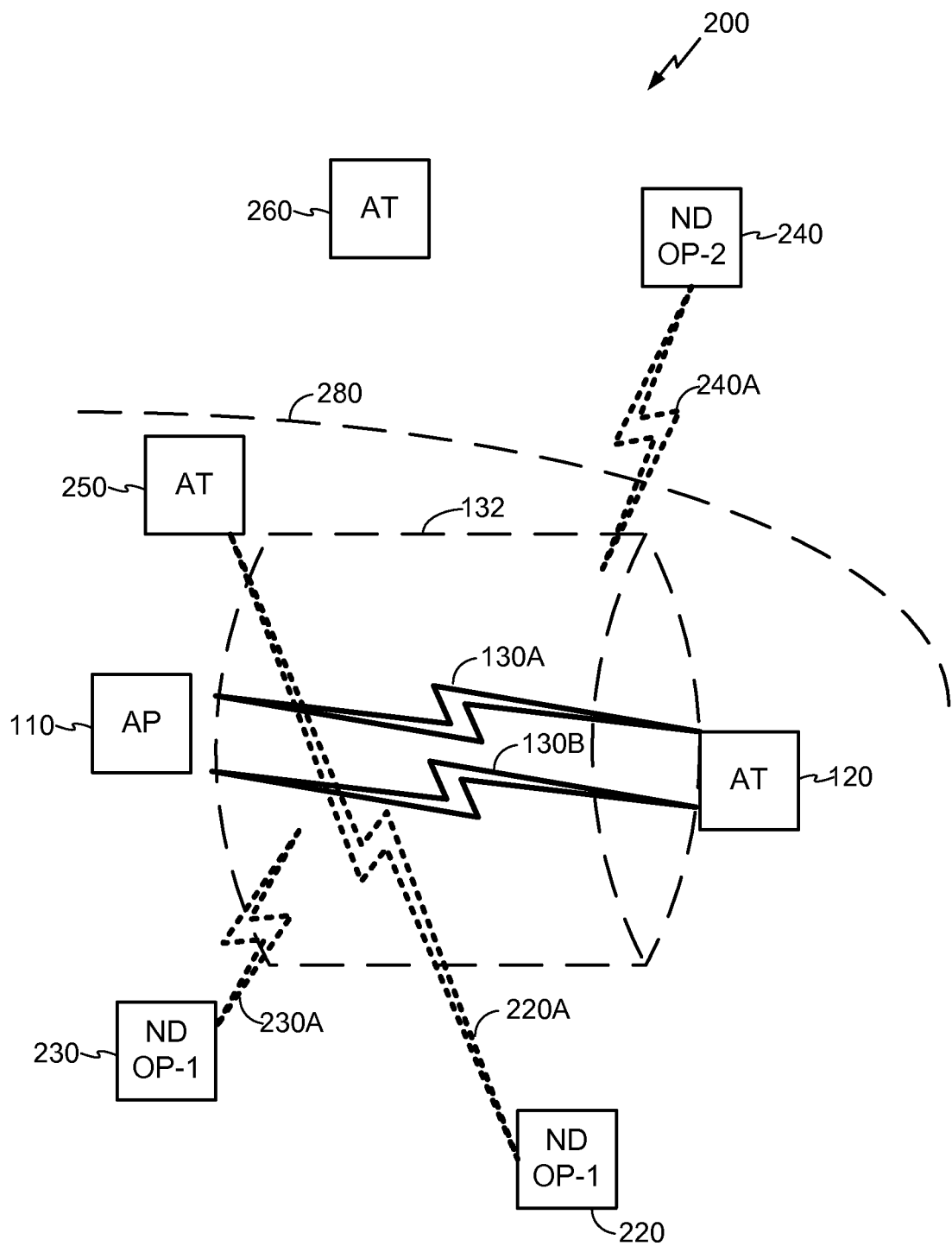
FIG. 2 illustrates an example of a broader wireless environment in which an access point and an access terminal may operate in accordance with an aspect of the disclosure.

FIG. 2 illustrates an example of a wireless environment 200 in which the access point 110 and the access terminal 120 of FIG. 1 may operate in accordance with an aspect of the disclosure. As shown, the access point 110 and the access terminal 120 share the wireless environment 200 with a plurality of other nodes 220, 230, and 240 (labeled as "ND" in FIG. 2). The term "node" as used herein may refer to an access point or an access terminal. In some implementations, one or more of the nodes 220, 230, and 240 is an access point, but, it will be understood that the term "node" may also refer to an access terminal. The nodes 220, 230, and 240 may also be associated with a particular operator. The nodes 220 and 230 may be associated with a common operator (labeled as "OP-1" in FIG. 2), whereas the node 240 may be associated with a different operator (labeled as "OP-2" in FIG. 2). The access point 110 and access terminal 120 also share the wireless environment 200 with a plurality of other access terminals (labeled as "AT" in FIG. 2), referred to hereinafter as access terminals 250 and 260.

As described above with reference to FIG. 1, the access point 110 may attempt to communicate with the access terminal 120 in accordance with a primary RAT. In the absence of other nodes, the access point 110 could use any one of a plurality of available channels to communicate with the access terminal 120 using the primary RAT. However, the communication medium between access point 110 and access terminal 120 using the primary RAT may be shared with the other devices in the wireless environment 200, as depicted in FIG. 2.

For example, secondary-RAT transmissions of signals via channels 220A, 230A, and 240A by the nodes 220, 230, and 240, respectively, may or may not cause interference within the shared communication medium (e.g., communication medium 132). In one possible scenario, the node 220 performs secondary-RAT communications on a particular channel 220A infringing the communication medium 132 (for example, to communicate with the access terminal 250, which may also transmit signals via channel 220A). However, as a result of the transmissions from the node 220 to the access terminal 250, the interference level may increase at the access point 110. Accordingly, the access point 110 may analyze the communication medium 132 and determine that the channel 220A used by the node 220 to communicate with the access terminal 250 has increased interference on one or more of the available channels (e.g., channel 130A, channel 130B, etc.). This interference may be detected by scanning all available channels (e.g., channel 130A, channel 130B, etc.) at an initial channel selection or during a channel reselection.

Similarly, the node 230 and the node 240 may perform primary-RAT or secondary-RAT communications on channels 230A and 240A, respectively. As a result, an interference level on one or more channels (e.g., channel 130A, channel 130B, etc.) may increase at the access point 110. Accordingly, the access point 110 may further determine that the one or more channels (e.g., channel 130A, channel 130B, etc.) are associated with increased interference caused by other nodes (e.g., one or more of nodes 230, and 240). It will be appreciated that although the channels and associated signals are illustrated as being generally linear, the transmissions are generally dispersed in a wide angle (up to 360 degrees) so that signaling energy and associated interference is not limited to a linear path.

From the perspective of the access point 110, a channel (e.g., channel 130A, channel 130B, etc.) having a sufficiently low interference level may be referred to as a clean channel (e.g., channel 130A, channel 130B, etc.). A clean channel (e.g., channel 130A, channel 130B, etc.) may be defined as a channel having interference that is less than a first threshold. The first threshold may be variously set depending on system design, radio access technology and/or implementation. In one example, the first threshold may be set to about −82 dBm. In this example, a channel (e.g., channel 130A, channel 130B, etc.) having an interference level that is less than −82 dBm would be referred to as a clean channel.

From the perspective of the access point 110, a node that causes a relatively high level of interference may be referred to as a proximate node. For example, a proximate node may be a node that causes an amount of interference that exceeds a proximity threshold. FIG. 2 depicts a proximity boundary 280 that separates proximate nodes (i.e., nodes 220 and 230) from nodes that are not proximate (i.e., node 240). The proximate nodes 220 and 230 cause an amount of interference that exceeds the proximity threshold, whereas the node 240 causes an amount of interference that does not exceed the proximity threshold. It will be appreciated that proximate does not necessarily infer that the proximate nodes are physically closer to the access point 110

The proximity threshold may be variously set. In one example, the proximity threshold may be set to be greater than the first threshold, discussed above to determine a clean channel on one or more of the available channels (e.g., channel 130A, channel 130B, etc.). For example, the proximity threshold may be derived from a known coexistence mechanism associated with nodes that are performing secondary-RAT operations. In one example, the nodes 220 and 230 may be WLAN access points that are generally configured to perform interference mitigation techniques if interference exceeds −42 dBm. Accordingly, the proximity threshold may be set to about −42 dBm, such that the access point 110 identifies a particular node as a proximate node based on a determination that the amount of interference including that caused by the particular node increases the total interference on a given channel (e.g., channel 130A, channel 130B, etc.) to greater than or equal to −42 dBm.

The interference level may be determined using any suitable measurement. For example, a received signal strength indicator (RSSI) may be used as a measurement of interference. In one example, the access point 110 may perform the monitoring by scanning one or more of the plurality of available channels (e.g., channel 130A, channel 130B, etc.). The scanning may be performed by any transceiver (or group of transceivers) associated with the access point 110.

The access point 110 may perform scanning using an LTE transceiver configured to monitor signaling in the wireless environment 200 for general signaling energy and/or information (e.g., operator information). Additionally or alternatively, the access point 110 may perform scanning using a WLAN transceiver configured to monitor the signaling for WLAN-specific signaling energy and/or specific information (e.g., basic service set identification (BSSID) for WLAN access points).

As another example, the access point 110 may perform the monitoring by receiving a channel measurement report for one or more of the plurality of available channels (e.g., channel 130A, channel 130B, etc.). The channel measurement report may be received from, for example, the access terminal 120 or another device in or monitoring the wireless environment 200.

It will be appreciated that a communication method in accordance with an aspect of the disclosure may be implemented by determining that an interference level for each of a plurality of available channels associated with a communication medium is greater than a first threshold based on monitoring signaling on the plurality of available channels, determining whether a triggering condition is met, and selecting the first channel as an operating channel for a primary radio access technology based on the triggering condition being met, the first channel having an interference level that is greater than a second threshold.

Figure 3:
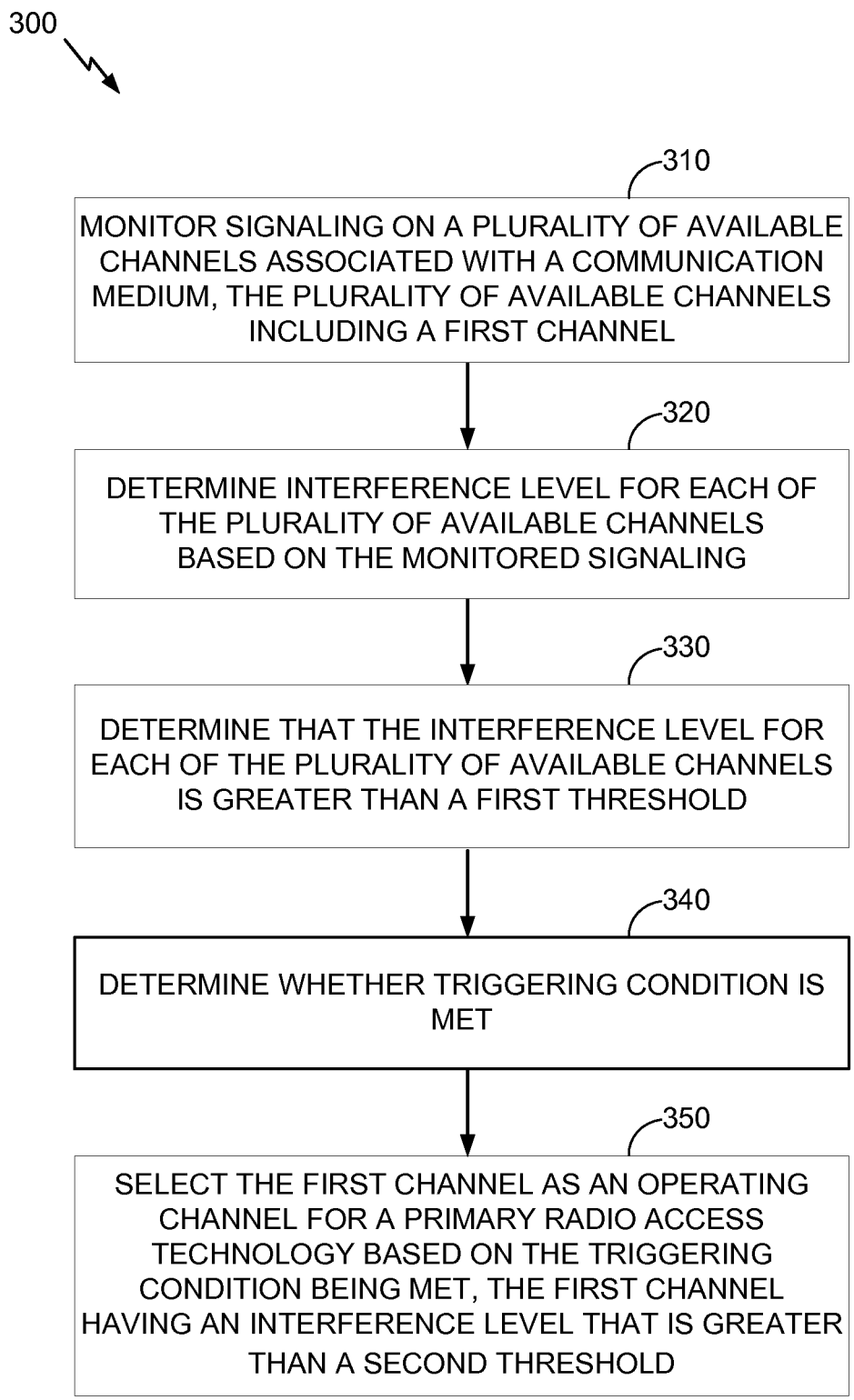
FIG. 3 illustrates an example method for channel selection in a shared communication medium in accordance with an aspect of the disclosure.

FIG. 3 illustrates a communication method 300 in accordance with an aspect of the disclosure. The communication method 300 may be performed by, for example, one or more components analogous to the primary-RAT transceiver 140, secondary-RAT transceiver 142, communication controller 114, processing system 116, and/or memory component 118 of the access point 110. For the purposes of illustration, the communication method 300 will be described below as it would be performed by the access point 110, however it will be appreciated that other devices and/or a combination of devices may perform the methods described herein.

At 310, the access point 110 monitors signaling on a plurality of available channels (e.g., channel 130A, channel 130B, etc.) associated with communication medium 132, the plurality of available channels may include a first channel 130A. The available channels may include all or a subset of channels in the communication medium 132. For example, if the communication medium 132 includes the U-NII band, then every channel in the U-NII band may be considered an available channel. However, in other examples, there may be one or more channels that may be excluded from the available channels and therefore would not necessarily be monitored. The monitoring at 310 may be performed by, for example, one or more components analogous to the primary-RAT transceiver 140, and/or secondary-RAT transceiver 142.

At 320, the access point 110 determines an interference levels for each of the plurality of available channels (e.g., channel 130A, channel 130B, etc.) based on the monitored signaling. In some examples, the access point 110 includes an LTE transceiver configured to monitor the signaling in the communication medium for general signaling energy and/or information. Additionally or alternatively, the access point 110 may include a WLAN transceiver configured to monitor the signaling in the communication medium for WLAN-specific signaling energy and/or information. The determining at 320 may be performed by, for example, one or more transceivers analogous to the primary-RAT transceiver 140 and the secondary-RAT transceiver 142.

At 330, the access point 110 determines that the interference levels for each of the plurality of available channels (e.g., channel 130A, channel 130B, etc.) are each greater than a first threshold. As discussed above, the first threshold may be defined based on various system considerations, and may be used to distinguish clean channels from channels that are not clean. Accordingly, the access point 110 may determine that no clean channels are available by determining that each of the plurality of available channels has an interference level that is greater than the first threshold. In one example, the first threshold can be −82 dBm, as discussed above. The access point 110 may compare the interference level for each of the plurality of available channels to the first threshold to determine which channels of the plurality of available channels exceed the first threshold. The determining at 330 may be performed by, for example, one or more transceivers analogous to the primary-RAT transceiver 140 and the secondary-RAT transceiver 142. Additionally or alternatively, the determining at 330 may be performed by, for example, a processor and memory analogous to the processing system 116 and memory component 118. The processor and memory may be used to store and further process the interference level for each of the plurality of available channels.

At 340, the access point 110 determines whether a triggering condition is met. The triggering condition may relate to a presence of proximate nodes associated with a common operator being operated in accordance with the secondary RAT. As will be discussed in greater detail below in relation to FIG. 4, the triggering condition may relate to whether there are two or more nodes associated with a common operator that are proximate to the access point 110. In another aspect, as will be discussed in greater detail below in relation to FIG. 5, the triggering condition may relate to whether the communication method 300 is performed indoors and/or whether the access point 110 is deployed indoors. The determining at 340 may be performed by, for example, one or more transceivers analogous to the primary-RAT transceiver 140 and the secondary-RAT transceiver 142. Additionally or alternatively, the determining at 330 may be performed by, for example, a processing system and memory component analogous to the processing system 116 and memory component 118.

At 350, the access point 110 selects the first channel 130A as an operating channel for a primary radio access technology based on the triggering condition being met at 340, the first channel 130A having an interference level that is greater than a second threshold. The second threshold can vary depending on various factors such as system design, radio access technology and/or implementation details. The selecting at 350 may be performed by, for example, one or more transceivers analogous to the primary-RAT transceiver 140 and the secondary-RAT transceiver 142. Additionally or alternatively, the determining at 330 may be performed by, for example, a processing system and memory component analogous to the processing system 116 and memory component 118.

In one example of the communication method 300, the first channel 130A and second channel 130B may both be determined to have interference levels that are greater than the first threshold (at 320). Moreover, the first channel 130A may have an interference level that is greater than the second threshold and the second channel 130B may have an interference level that is less than the second threshold. In this example, if the access point 110 determines that the triggering condition is met, the access point 110 selects the first channel 130A as the operating channel even though the second channel 130B has a lower interference level.

In particular, the nodes 220 and 230 may be WLAN access points, and the second threshold may be selected based on a predicted response of the nodes 220 and 230 to a high interference level on an operating channel (e.g., the first channel 130A or second channel 130B). For example, the nodes 220 and 230 may be configured to reduce operations on the operating channel based on a determination that an interference level on the operating channel is greater than −62 dBm. Accordingly, the second threshold may be set to about −62 dBm.

In an example, the node 220 is operating on first channel 130A such that the interference level on the first channel 130A is greater than the second threshold (e.g., greater than −62 dBm), and the node 230 is operating on the second channel 130B such that the interference level on the second channel 130B is less than the second threshold (e.g., between −82 dBm and −62 dBm). The access point 110 may have a choice of selecting the first channel 130A as an operating channel or selecting the second channel 130B as the operating channel.

If the access point 110 selects (and operates on) the first channel 130A, then the node 220 may experience interference levels on the first channel 130A that are greater than the second threshold. Because the node 220 is configured to reduce operations on the first channel 130A in response to interference levels that are greater than the second threshold, the access point 110 can cause the node 220 to reduce operations on the first channel 130A by selecting (and operating on) the first channel 130A. For example, the access point 110 may operate on the first channel 130A during an activated period of a discontinuous transmission communication scheme. During the activated periods, the node 220 will reduce operations on the first channel 130A. Moreover, during a deactivated period of the discontinuous transmission communication scheme, the node 220 can re-continue operations on the first channel 130A.

However, if the access point 110 selects (and operates on) the second channel 130B, then the node 230 will experience interference levels on the second channel 130B that are between the first threshold and the second threshold. The node 230, like the node 220, may be configured to reduce operations in response to a determination that there the operating channel has interference levels above the second threshold. But because the node 230 may not be experiencing interference levels above the second threshold, it will not reduce operations on the second channel 130B. As a result, the access point 110 cannot cause the node 230 to reduce operations on the second channel 130B by selecting (and operating on) the second channel 130B. Moreover, when the access point 110 operates on the second channel 130B (e.g., during an activated period of a discontinuous transmission communication scheme), the node 230 may not use the second channel 130B in an efficient manner due to, for example, rate control.

Accordingly, under the circumstances set forth in this example, the access point 110 may select the first channel 130A having a greater interference level (e.g., an interference level above −62 dBm) rather than the second channel 130B having a lower interference level (e.g., an interference level between −82 dBm and −62 dBm).

Figure 4:
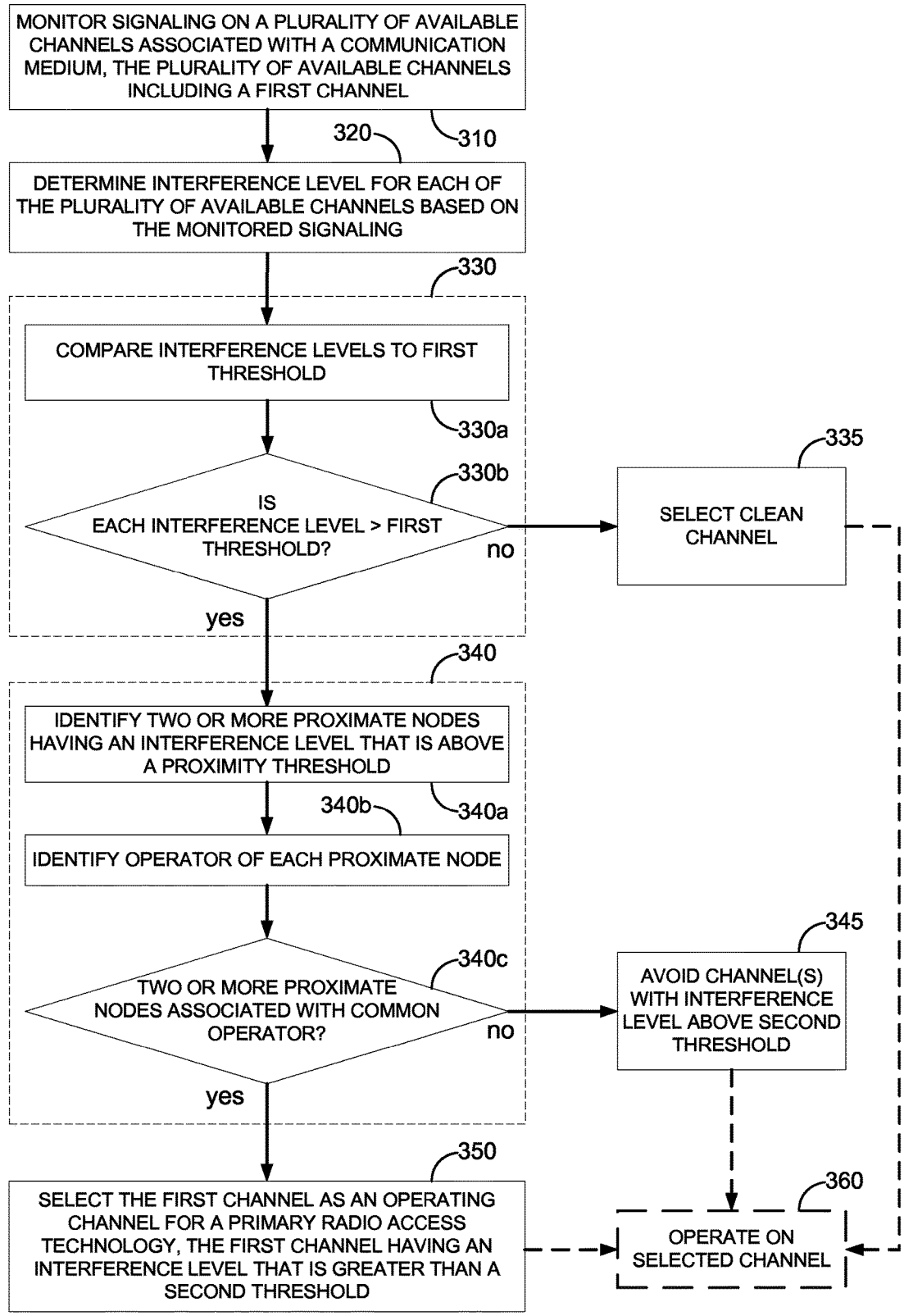
FIG. 4 illustrates in more detail an example implementation of certain aspects of the method of FIG. 3.

FIG. 4 illustrates in more detail an example implementation of certain aspects of the example method 300 of FIG. 3. In this implementation, more specific operations are shown for the determining at 330 and the determining at 340. For the purposes of illustration, the method of FIG. 4 will be described below as it would be performed by the access point 110, however, it will be appreciated that other devices may perform the methods described herein.

As noted above in the foregoing description of FIG. 3, the access point 110 monitors signaling on a plurality of available channels associated with communication medium 132, the plurality of available channels including a first channel 130A (at 310) and determines interference levels for each of the plurality of available channels based on the monitored signaling (at 320). For brevity, the descriptions of 310 and 320 will not be repeated here.

As noted above in the foregoing description of FIG. 3, the access point 110 determines at 330 that the interference levels for each of the plurality of available channels are each greater than a first threshold. More specific operations for the determining at 330 (labeled in FIG. 3 as 330*a* and 330*b*) are described below.

At 330*a*, the access point 110 compares the interference levels to a first threshold. For example, at 320, the access point 110 may determine a first interference level for first channel 130A and a second interference level for second channel 130B. Then, at 330*a*, the access point 110 may compare the first interference level and the second interference level to the first threshold.

At 330*b*, the access point 110 determines if each interference level is greater than the first threshold. If each interference level is not greater than the first threshold ('no' at 330*b*), then the method proceeds to 335. For example, if one or more of the plurality of available channels is a clean channel having an interference level below the first threshold, then the method proceeds to 335. At 335, the access point 110 selects a clean channel as an operating channel.

If each interference level is greater than the first threshold ('yes' at 330*b*), then the method proceeds to 340. For example, if none of the plurality of available channels is a clean channel having an interference level below the first threshold, then the method proceeds to 340 to determine whether a triggering condition is met.

In one example, the plurality of available channels may include each channel in the U-NII spectrum. Accordingly, if the access point 110 determines at 330*a* and 330*b* that at least one of the channels in the U-NII spectrum is a clean channel, then the access point 110 will select a clean channel for primary-RAT operations at 335. If the access point 110 determines at 330*a* and 330*b* that none of the plurality of available channels in the U-NII spectrum are clean, then the access point 110 will proceed to 340 to determine whether a triggering condition is met.

As noted above in the foregoing description of FIG. 3, the access point 110 determines at 340 whether a triggering condition is met. More specific operations for the determining at 340 (labeled in FIG. 4 as 340*a*, 340*b*, and 340*c*) are described below.

At 340*a*, the access point 110 may identify two or more proximate nodes having an interference level that is greater than a proximity threshold. As noted above, the proximity threshold may be set variously and a proximate node may be defined as a node that causes the interference level on any available channel to exceed the proximity threshold. Returning to an example from the description of FIG. 2, the nodes 220 and 230 may each be identified as proximate nodes based on a determination that they are both associated with one or more channels having interference levels greater than −42 dBm.

At 340*b*, the access point 110 identifies an operator of each proximate node. In one example, the proximate node is a WLAN access point, and the operator is identified based on a basic service set identification (BSSID) of the WLAN access point. In one example, this information may be obtained from the secondary-RAT of access point 110.

At 340*c*, the access point 110 determines whether there are two or more proximate nodes associated with a common operator. If one or fewer proximate nodes are associated with a common operator ('no' at 340*c*), then the method of FIG. 4 proceeds to 345. At 345, the access point 110 avoids channels with interference levels that are greater than the second threshold. For example, the access point 110 may avoid a particular channel by selecting a channel that is not the avoided channel. If two or more proximate nodes are associated with a common operator ('yes' at 340*c*), then the method of FIG. 4 proceeds to 350.

As noted above in the foregoing description of FIG. 3, the access point 110 selects at 350 the first channel 130A as an operating channel for a primary radio access technology based on the triggering condition being met at 340, the first channel 130A having an interference level that is greater than a second threshold. For brevity, the descriptions of 350 will not be repeated here.

After a channel is avoided or selected as an operating channel (as at 335, 345, or 350), the method of FIG. 4 may terminate. Additionally or alternatively, the method of FIG. 4 may proceed to 360, where the access point 110 operates on the selected channel using the primary RAT. For example, the access point 110 may transmit data or control signals to the access terminal 120 using the selected operating channel.

Figure 5:
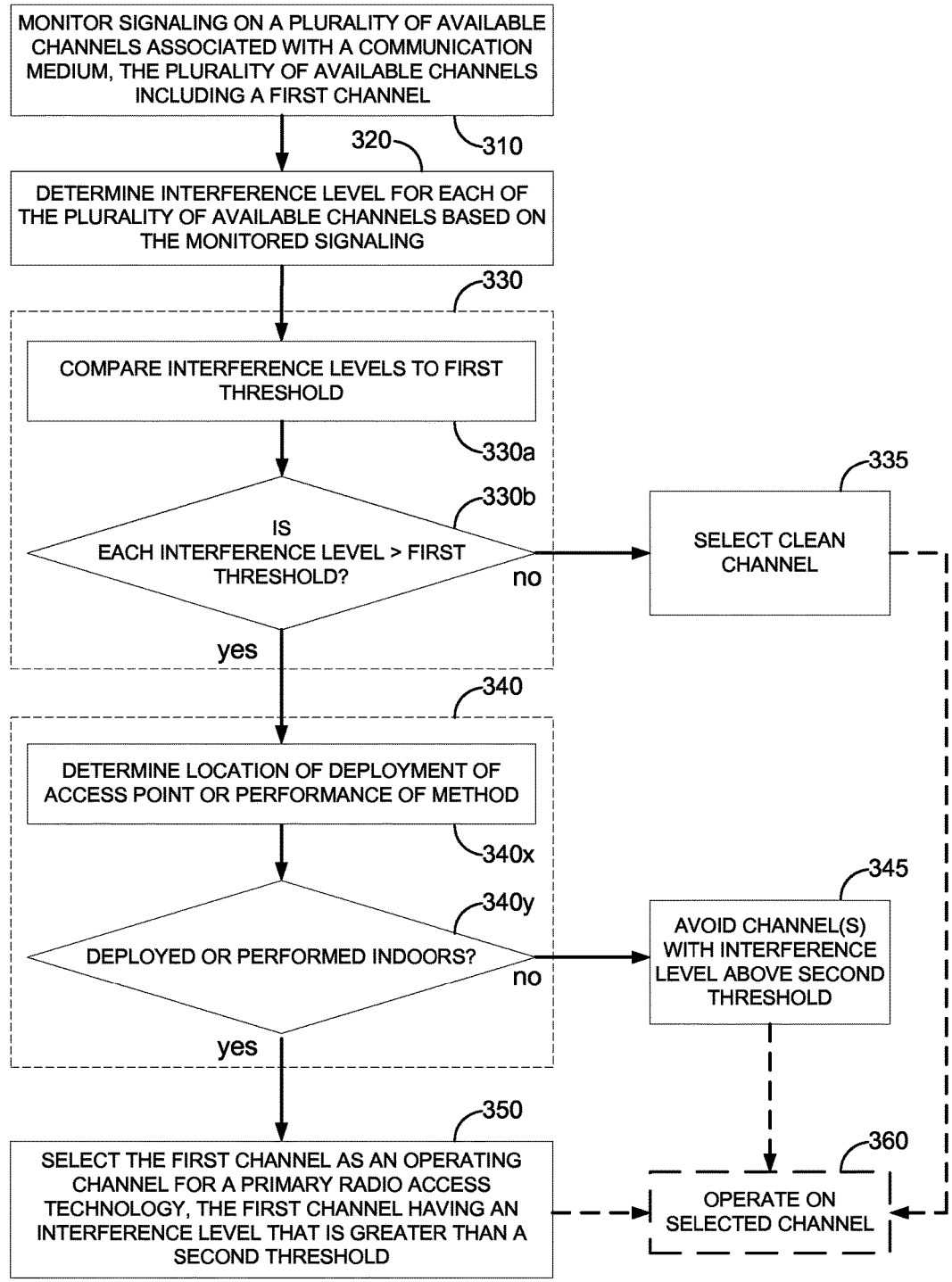
FIG. 5 illustrates in more detail another example implementation of certain aspects of the method of FIG. 3.

FIG. 5 illustrates in more detail an example implementation of certain aspects of the example method 300 of FIG. 3. The only difference between FIG. 5 and FIG. 4 is that the determining at 340 consists of an alternative set of specific operations (340x and 340y rather than 340a, 340b, and 340c). For the purposes of illustration, the method of FIG. 5 will be described below as it would be performed by the access point 110, however, it will be appreciated that other devices may perform the methods described herein.

As noted in the foregoing description of FIGS. 3-4, the access point 110 monitors signaling on a plurality of available channels associated with communication medium 132, the plurality of available channels including a first channel 130A (at 310) and determines interference levels for each of the plurality of available channels based on the monitored signaling (at 320), compares the interference levels to a first threshold (at 330a), determines if each interference level is greater than the first threshold (at 330b), and (depending on the outcome of the determining at 330b) selects a clean channel as an operating channel (at 335). For brevity, the descriptions of 310, 320, 330a, 330b, and 335 will not be repeated here.

The method of FIG. 5 proceeds to 340 if the interference level of each of the plurality of available channels is greater than the first threshold ('yes' at 330b).

At 340x, the access point 110 determines a location at which the access point 110 is deployed. Additionally or alternatively, the access point 110 determines at 340x the location at which the method of FIG. 5 is performed, if the determinations are being performed in whole or part by a another device. The access point 110 may perform this determination in any suitable manner, using, for example, known locating techniques (e.g., use GPS, visible nodes, etc.). Additionally or alternatively, the access point 110 may be configured at the time of installation such that its location is known a priori. For example, data relating to the location of the access point 110 may be recorded at the time of installation in a memory component of the access point 110 (e.g., memory component 118 depicted in FIG. 1).

At 340y, the access point 110 determines whether the access point 110 is deployed indoors. Additionally or alternatively, the access point 110 may determine (at 340y) whether the method of FIG. 5 is performed indoors. The access point 110 may perform this determination using the aforementioned locating techniques. Additionally or alternatively, the access point 110 may be configured at the time of installation such that the access point 110 knows a priori that it is deployed indoors. For example, data relating to the location of the access point 110 may be recorded in a memory component of the access point 110 (analogous to the memory component 118 depicted in FIG. 1).

If it is determined at 340y that the access point 110 is not deployed indoors ('no' at 340y of FIG. 5), then the method proceeds to 345. If it is determined at 340y that the access point 110 is deployed indoors ('yes' at 340y of FIG. 5), then the method proceeds to 350. At 345, the access point 110 avoids channels with interference levels that are greater than the second threshold (as noted in the foregoing description of FIGS. 3-4). At 350, the access point 110 selects the first channel 130A as an operating channel for a primary radio access technology, the first channel 130A having an interference level that is greater than a second threshold (as noted in the foregoing description of FIGS. 3-4). Optionally, at 360, the access point 110 operates on the selected channel using the primary RAT (as noted in the foregoing description of FIGS. 3-4). For brevity, the descriptions of 345, 350, and 360 will not be repeated here.

Figure 6:
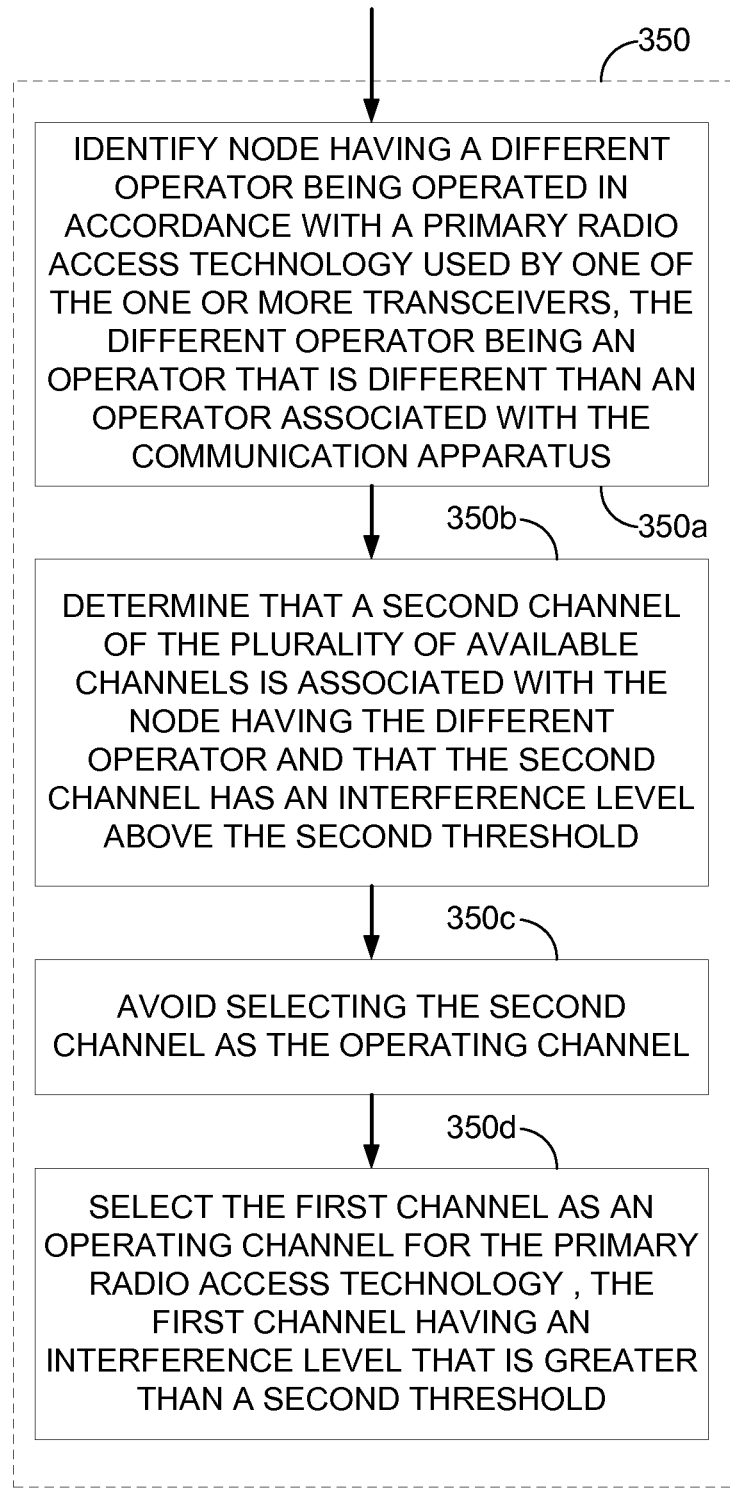
FIG. 6 illustrates in more detail another example implementation of certain aspects of the method of FIG. 3.

FIG. 6 illustrates in more detail an example implementation of certain aspects of the example method 300 of FIG. 3. In this implementation, more specific operations are shown for the selecting at 350. For the purposes of illustration, the method of FIG. 6 will be described below as it would be performed by the access point 110, however, it will be appreciated that other devices may perform the methods described herein.

As noted above in the foregoing description of FIG. 3, the access point 110 selects at 350 the first channel 130A as an operating channel for a primary radio access technology based on the triggering condition being met at 340, the first channel 130A having an interference level that is greater than a second threshold. More specific operations for the selecting at 350 (labeled in FIG. 6 as 350a, 350b, 350c, and 350d) are described below.

At 350a, the access point 110 identifies a node having a different operator (e.g., one or more of nodes 220, 230, and 240) being operated in accordance with a primary radio access technology (e.g., LTE) used by one of the one or more transceivers (e.g., the primary-RAT transceiver 140). The different operator may be an operator that is different than an operator that performs the identifying at 350a.

At 350b, the access point 110 determines that a second channel of the plurality of available channels (e.g., second channel 130B) is associated with the node having the different operator and that the second channel 130B has an interference level greater than the second threshold.

At 350c, the access point 110 avoids selecting the second channel 130B as the operating channel. The access point 110 may avoid the second channel 130B by, for example, selecting a different channel from the plurality of available channels as the operating channel (e.g., avoiding the second channel 130B by selecting the first channel 130A). The access point 110 may avoid the second channel 130B as a candidate or selection as the operating channel even if it otherwise fits the criteria for selection as the operating channel.

At 350d, the access point 110 selects the first channel 130A as the operating channel for a primary radio access technology based on the triggering condition being met, the first channel 130A having an interference level that is greater than a second threshold.

In an example, consider a scenario where both the first channel 130A and the second channel 130B have interference levels that are greater than the second threshold. In this scenario, either channel may be a candidate for selection as the operating channel, and the access point 110 may be indifferent as to which of the two channels is selected. However, if the second channel 130B is avoided as a candidate for the operating channel at 350c because the second channel 130B is associated with a node having the different operator and operating on the primary radio access technology, as discussed above, then the access point 110 would select the first channel 130A at 350d.

For convenience, the access point 110 and the access terminal 120 are shown in FIG. 1 as including various components that may be configured according to the various examples described herein. It will be appreciated, however, that the illustrated blocks may be implemented in various ways. In some implementations, the components of FIG. 1 may be implemented in one or more circuits such as, for example, one or more processors and/or one or more ASICs (which may include one or more processors). Here, each circuit may use and/or incorporate at least one memory component for storing information or executable code used by the circuit to provide this functionality.

Figure 7:
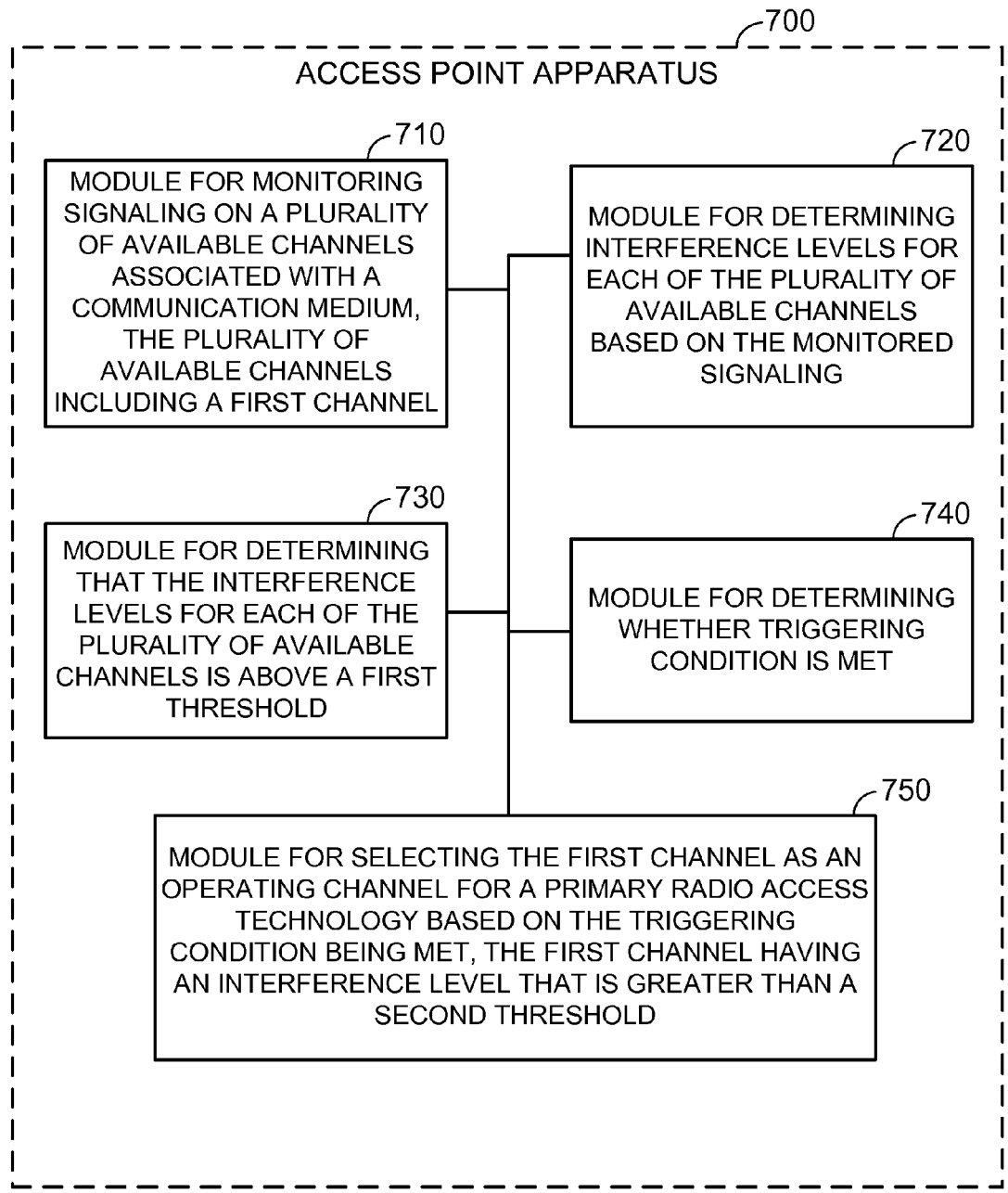
FIG. 7 illustrates an example access point apparatus represented as a series of interrelated functional modules.

FIG. 7 provides an alternative illustration of a communication apparatus 700 for implementing the access point 110 represented as a series of interrelated functional modules. A module 710 for monitoring signaling on a plurality of available channels associated with a communication medium, the plurality of available channels including a first channel 130A may correspond at least in some aspects to, for example, a communication device or a component thereof as discussed herein (e.g., the communication device 112 or the like). A module 720 for determining an interference level for each of the plurality of available channels based on the monitored signaling may correspond at least in some aspects to, for example, a communication controller or a component thereof as discussed herein (e.g., the communication controller 114 or the like). A module 730 for determining that the interference level for each of the plurality of available channels is greater than a first threshold may correspond at least in some aspects to, for example, a communication controller or a component thereof as discussed herein (e.g., the communication controller 114 or the like). A module 740 for determining whether a triggering condition is met may correspond at least in some aspects to, for example, a communication controller or a component thereof as discussed herein (e.g., the communication controller 114 or the like). A module 750 for selecting the first channel 130A as an operating channel for a primary radio access technology based on the triggering condition being met, the first channel 130A having an interference level that is greater than a second threshold may correspond at least in some aspects to, for example, a communication controller or a component thereof as discussed herein (e.g., the communication controller 114 or the like).

The functionality of the modules 710-750 of FIG. 7 may be implemented in various ways consistent with the teachings herein. In some designs, the functionality of these modules may be implemented as one or more electrical components. In some designs, the functionality of these modules may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 7, as well as other components and functions described herein, may be implemented using any suitable means. Such means also may be implemented, at least in part, using corresponding structure as taught herein. For example, the components described above in conjunction with the "module for" components of FIG. 7 also may correspond to similarly designated "code for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium known in the art. As used herein the term "non-transitory" does not exclude any physical storage medium or memory and particularly does not exclude dynamic memory (e.g., RAM) but rather excludes only the interpretation that the medium can be construed as a transitory propagating signal. An example storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a non-transitory computer-readable medium comprising at least one instruction for causing a processor to perform operations, comprising code for monitoring signaling on a plurality of available channels associated with a communication medium, the plurality of available channels including a first channel 130A and a second channel 130B, code for determining, based on the monitored signaling, that a corresponding interference level for each of the plurality of available channels is greater than a first threshold, code for detecting a first interference level of the first channel 130A being greater than a second interference level for the second channel 130B, and code for selecting the first channel 130A as an operating channel.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication apparatus, comprising:
    one or more transceivers configured to monitor signaling on a plurality of available channels associated with a communication medium, the plurality of available channels including a first channel;
    at least one processor; and
    at least one memory coupled to the at least one processor, wherein the at least one processor and the at least one memory are configured to:
        determine an interference level for each of the plurality of available channels based on the monitored signaling,
        determine that the interference level for each of the plurality of available channels is greater than a first threshold,
        determine whether a triggering condition is met, and
        select the first channel as an operating channel for a primary radio access technology based on the triggering condition being met, the first channel having an interference level that is greater than a second threshold.

2. The communication apparatus of claim 1, wherein the first threshold is equal to 82 dBm.

3. The communication apparatus of claim 1, wherein the second threshold is equal to 62 dBm.

4. The communication apparatus of claim 1, wherein the at least one processor and the at least one memory are being configured to determine whether the triggering condition is met comprises being further configured to by:
    determining a presence of two or more proximate nodes associated with a common operator being operated in accordance with a secondary radio access technology.

5. The communication apparatus of claim 4, wherein the at least one processor and the at least one memory are configured to determine the presence of the two or more proximate nodes associated with the common operator by:
    identifying proximate nodes each having an interference level that is greater than a proximity threshold; and
    identifying an operator of each proximate node.

6. The communication apparatus of claim 5, wherein the proximity threshold is equal to 42 dBm.

7. The communication apparatus of claim 4, wherein the at least one processor and the at least one memory are configured to determine the presence of the two or more proximate nodes associated with the common operator by:
    determining that the communication apparatus is deployed indoors.

8. The communication apparatus of claim 1, wherein the at least one processor and the at least one memory are further configured to:
    identify a node having a different operator being operated in accordance with the primary radio access technology used by one of the one or more transceivers;
    determine that a second channel of the plurality of available channels is associated with the node having the different operator and that the second channel has an interference level greater than the second threshold; and
    avoid selection of the second channel as the operating channel.

9. The communication apparatus of claim 1, wherein the one or more transceivers are configured to monitor the signaling by one or more of scanning one or more of the plurality of available channels, receiving, from another device, a channel measurement report for one or more of the plurality of available channels, or any combination thereof.

10. The communication apparatus of claim 1, wherein the one or more transceivers include one or more of a Long-Term Evolution transceiver configured to operate in an unlicensed band and to monitor the signaling for general signaling energy, a wireless local area network (WLAN) transceiver configured to monitor the signaling for WLAN-specific signaling energy, or any combination thereof.

11. A communication method, comprising:
    monitoring signaling on a plurality of available channels associated with a communication medium, the plurality of available channels including a first channel;
    determining an interference level for each of the plurality of available channels based on the monitored signaling;
    determining that the interference level for each of the plurality of available channels is greater than a first threshold;
    determining whether a triggering condition is met; and
    selecting the first channel as an operating channel for a primary radio access technology based on the triggering condition being met, the first channel having an interference level that is greater than a second threshold.

12. The communication method of claim 11, wherein the first threshold is equal to 82 dBm.

13. The communication method of claim 11, wherein the second threshold is equal to 62 dBm.

14. The communication method of claim 11, wherein the determining whether the triggering condition is met further comprises:
    determining a presence of two or more proximate nodes associated with a common operator being operated in accordance with a secondary radio access technology.

15. The communication method of claim 14, wherein the determining the presence of the two or more proximate nodes associated with the common operator comprises:

identifying proximate nodes each having an interference level that is greater than a proximity threshold; and identifying an operator of each proximate node.

16. The communication method of claim 15, wherein the proximity threshold is equal to 42 dBm.

17. The communication method of claim 14, wherein the determining the presence of the two or more proximate nodes associated with the common operator comprises:

determining that the communication method is performed indoors.

18. The communication method of claim 11, further comprising:

identifying a node having a different operator being operated in accordance with the primary radio access technology;

determining that a second channel of the plurality of available channels is associated with the node having the different operator and that the second channel has an interference level greater than the second threshold; and avoiding selection of the second channel as the operating channel.

19. The communication method of claim 11, wherein the monitoring signaling comprises one or more of scanning one or more of the plurality of available channels, receiving, from another device, a channel measurement report for one or more of the plurality of available channels, or any combination thereof.

20. The communication method of claim 11, wherein the monitoring signaling comprises one or more of monitoring signaling for general signaling energy, monitoring signaling for WLAN-specific signaling energy, or any combination thereof.

21. A communication apparatus, comprising:

means for monitoring signaling on a plurality of available channels associated with a communication medium, the plurality of available channels including a first channel;

means for determining an interference level for each of the plurality of available channels based on the monitored signaling;

means for determining that the interference level for each of the plurality of available channels is greater than a first threshold;

means for determining whether a triggering condition is met; and means for selecting the first channel as an operating channel for a primary radio access technology based on the triggering condition being met, the first channel having an interference level that is greater than a second threshold.

22. The communication apparatus of claim 21, wherein the means for determining whether the triggering condition is met are further configured to:

determine a presence of two or more proximate nodes associated with a common operator being operated in accordance with a secondary radio access technology.

23. The communication apparatus of claim 22, wherein the means for determining the presence of the two or more proximate nodes associated with the common operator are further configured to:

identify proximate nodes each having an interference level that is greater than a proximity threshold; and identify an operator of each proximate node.

24. The communication apparatus of claim 22, wherein the means for determining the presence of the two or more proximate nodes associated with the common operator are further configured to:

determine that the communication apparatus is deployed indoors.

25. The communication apparatus of claim 21, further comprising:

means for identifying a node having a different operator being operated in accordance with the primary radio access technology used by one of one or more transceivers;

means for determining that a second channel of the plurality of available channels is associated with the node having the different operator and that the second channel has an interference level greater than the second threshold; and means for avoiding selection of the second channel as the operating channel.

26. A non-transitory computer-readable medium comprising at least one instruction for causing a processor to perform operations, comprising:

code for monitoring signaling on a plurality of available channels associated with a communication medium for a communication apparatus, the plurality of available channels including a first channel;

code for determining an interference level for each of the plurality of available channels based on the monitored signaling;

code for determining that the interference level for each of the plurality of available channels is greater than a first threshold;

code for determining whether a triggering condition is met; and code for selecting the first channel as an operating channel for a primary radio access technology based on the triggering condition being met, the first channel having an interference level that is greater than a second threshold.

27. The non-transitory computer-readable medium of claim 26, wherein the code for determining whether the triggering condition is met further comprises:

code for determining a presence of two or more proximate nodes associated with a common operator being operated in accordance with a secondary radio access technology.

28. The non-transitory computer-readable medium of claim 27, wherein the code for determining the presence of the two or more proximate nodes associated with the common operator comprises:

code for identifying proximate nodes each having an interference level that is greater than a proximity threshold; and code for identifying an operator of each proximate node.

29. The non-transitory computer-readable medium of claim 27, wherein the code for determining the presence of the two or more proximate nodes associated with the common operator comprises:

code for determining that the non-transitory computer-readable medium is deployed indoors.

30. The non-transitory computer-readable medium of claim 26, further comprising:

code for identifying a node having a different operator being operated in accordance with the primary radio access technology;

code for determining that a second channel of the plurality of available channels is associated with the node having the different operator and that the second channel has an interference level greater than the second threshold; and code for avoiding selection of the second channel as the operating channel.

* * * * *

UNITED STATES PATENT AND TRADEMARK OFFICE
CERTIFICATE OF CORRECTION

PATENT NO. : 9,936,400 B2
APPLICATION NO. : 14/852515
DATED : April 3, 2018
INVENTOR(S) : Heechoon Lee et al.

Page 1 of 1

It is certified that error appears in the above-identified patent and that said Letters Patent is hereby corrected as shown below:

On Column 17, Line 54:
Insert a -- - -- immediately prior to "82 dBm"

On Column 17, Line 56:
Insert a -- - -- immediately prior to "62 dBm"

On Column 18, Line 5:
Insert a -- - -- immediately prior to "42 dBm"

On Column 18, Line 56:
Insert a -- - -- immediately prior to "82 dBm"

On Column 18, Line 58:
Insert a -- - -- immediately prior to "62 dBm"

On Column 19, Line 5:
Insert a -- - -- immediately prior to "42 dBm"

Signed and Sealed this
Twenty-fourth Day of July, 2018

Andrei Iancu
*Director of the United States Patent and Trademark Office*